UNITED STATES PATENT OFFICE.

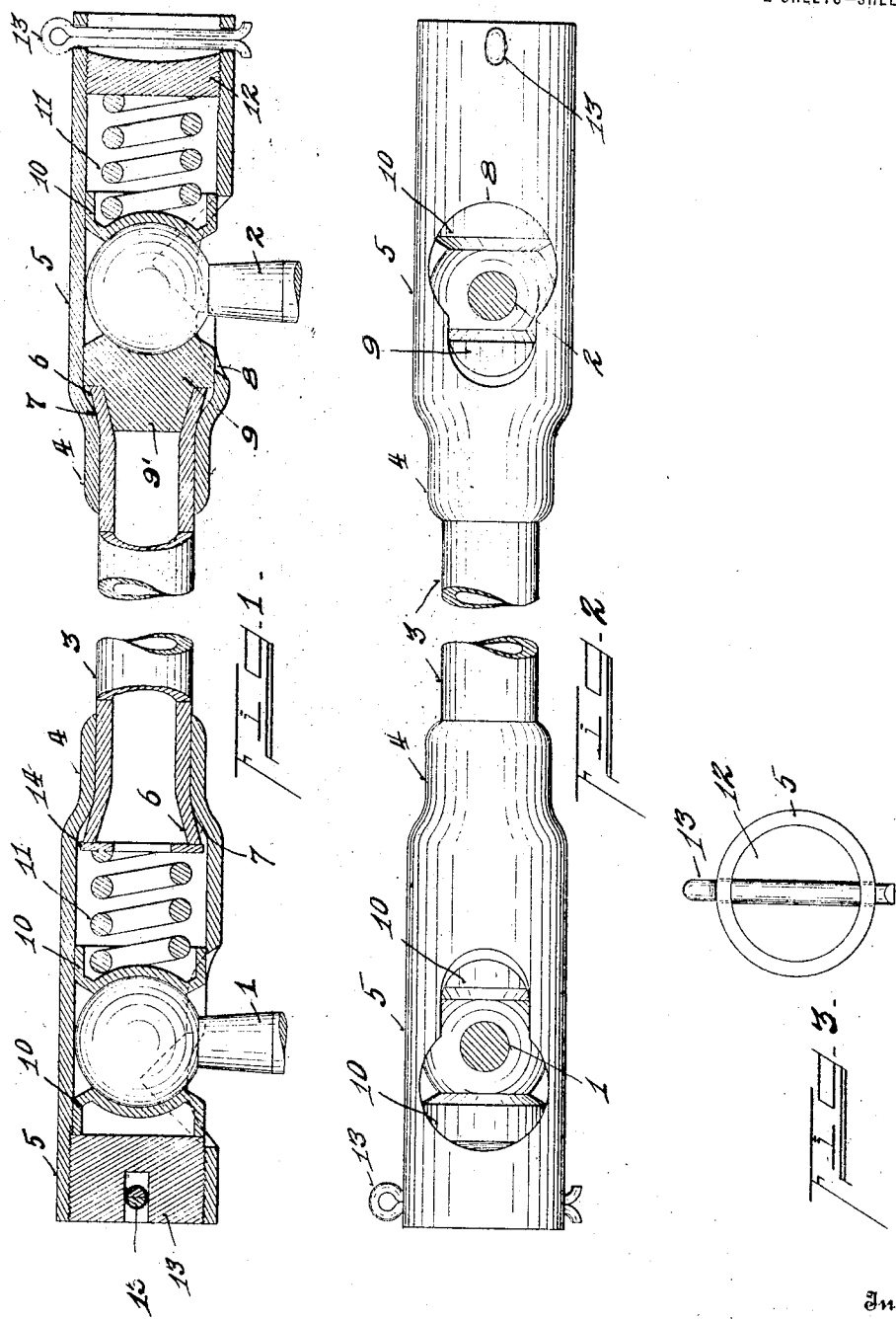

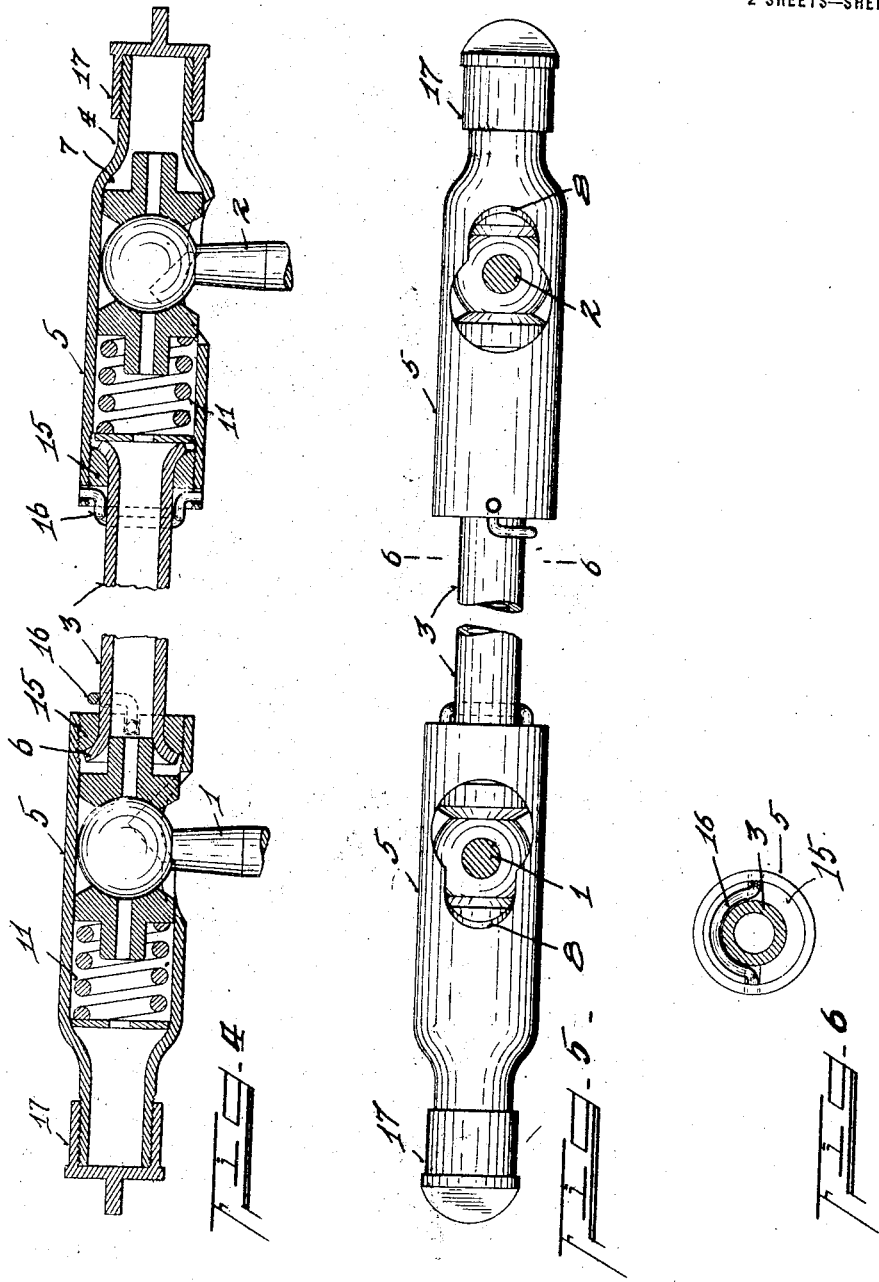

RICHARD A. KAPS, OF CINCINNATI, OHIO, ASSIGNOR TO THE CINCINNATI BALL CRANK COMPANY, OF CINCINNATI, OHIO, A CORPORATION OF OHIO.

STEERING REACH-ROD.

1,337,138.  Specification of Letters Patent.  Patented Apr. 13, 1920.

Application filed July 5, 1919. Serial No. 308,643.

*To all whom it may concern:*

Be it known that I, RICHARD A. KAPS, a citizen of the United States, and residing at Cincinnati, in the county of Hamilton and State of Ohio, have invented a new and useful Improvement in Steering Reach-Rods, of which the following specification is a full disclosure.

My invention relates to steering reach rods, also termed "drag links," principally as applied to motor vehicles or automobiles and practically to forming the rod from lengths of tubing of different diameters connected together without brazing or welding; to provide a rod having a small diameter middle section with larger diameter hub ends, as sockets for ball crank arms.

An object is to provide a form of device of this sort, which shall be simple and economical to manufacture, and in which the tenacity of the tubing metal is not weakened or reduced in the process of forming as is occasioned in rods made in continuous form.

Another object of the invention is to provide a steering rod having one or both ends hubbed, the hubs formed of tubing of larger diameter than the intermediate rod portion connected together telescopically one within the other, with the end of the inner tube expanded against a shoulder provided within the outer or larger diameter tube.

Steering reach rods usually have the crank arms of the steering gears socketed respectively into the opposite hub ends of the rod at an angle to one another, this requiring great accuracy in relatively placing the keyhole slots through the hubs, to avoid the engagement of the neck portions of the crank arms against the edges of the slots, which, if permitted, cause a wearing cut into the crank arm and twisting strains to the rod.

Another object, therefore, is to join the hubs to the intermediate or link portion so as to be free to swivel one on the other, eliminating the accurate relative angular placing of the key-hole slots in the hubs, as in a continuous solid rod as the hubs accommodate themselves to the relative angle to which the crank arms may be disposed or moved in the throw of the steering gear or vibrating motion of the car.

Various other features and advantages and combination of parts will be more fully revealed from the following description of the accompanying drawings, forming a part of this specification, and in such drawings like characters of reference denote corresponding parts throughout the several views, of which:

Figure 1 is a central section of the steering crank rod, with both ends of steering crank arms connected with the rod at opposite ends.

Fig. 2 is a side elevation of the rod.

Fig. 3 is an end view.

Fig. 4 is a central section similar to Fig. 1, illustrating a modified form of rod.

Fig. 5 is a side elevation of the modified form shown in Fig. 4.

Fig. 6 is a section on line 6, 6, Fig. 5.

Steering reaches or steering rod connections, more particularly as applied to automobiles, comprise a tubular rod having hub or enlarged ends, into which crank arms of the steering gear are socketed. The rod usually represents a continuous piece of tubing from one end to the other, and several methods of manufacture are practised for shaping the tubing stock into the particular form, so as to develop a continuous rod in which the middle portion is of smaller tubular diameter than the ends which provide the sockets. One method is to make the rod from a tubing stock size of a proper diameter for the middle portion of the rod, and enlarge the diameter of its ends by swaging. Another method is to make the middle portion of the proper size of tubing stock, and hub ends of another large size of tubing stock, compressing one end of said hub stock to the size of the tubing used for the middle portion and then weld, braze or solder the hub ends to the middle portion. The tenacity of the metal under a swaging or compressing treatment is materially reduced so that the rod is the weakest at the juncture between the larger and smaller diameters.

With my improvements, the rod is materially strengthened at the juncture point between the two different diameters.

Referring to the drawings, 1 and 2 represent respectively ball crank arms extending downward from the steering gear, one is operated by suitable steering wheel or other steering control device in the usual and well-known manner, and is engaged into the socket at one end of the steering rod. The second arm extends to connections with the running wheels and connects into a socket at the opposite end of the steering rod. The sockets at the opposite ends of the rod may be of duplicate construction or otherwise, to meet the demands of the trade.

The middle portion 3 of the rod is made from a length of tubing of a proper diameter and has its opposite ends respectively engaged into the reduced diameter ends 4 of tubular hub sections or members 5. Each hub 5 is formed of a piece of tubing of larger diameter than the tubing 3, forming the middle portion or link or link section of the rod. The hub section is compressed at one end to provide an internal diameter corresponding approximately to the external diameter of the link section 3. The end 6 of the rod 3 is expanded or annularly flanged over the annular shoulder 7, formed by compressing or reducing the diameter of the hub section 5 to the external diameter of the link section 3. This secures the hub section 5 to the middle or link section 3 against endwise displacement or removal and provides a double thickness of material at the connection or joint of the two parts. The telescopic union of the two tubing parts are to allow one part to be swiveled upon the other.

Each hub section 5 has its wall provided with an aperture 8 of key-hole outline, with the circular part thereof larger in diameter than the ball end of the crank arm to permit the ball to be inserted into the hub and oblong slotted portion, permitting movement of the arm longitudinally of the hub, and also confining the arm within the hub against lateral displacement. The ball of the crank arm is engaged between two opposite socketed pieces or seats, one or both yieldingly urged against the ball. The socket parts may follow any of the well-known types of construction and manner of arrangement, the drawings herein disclosing several different arrangements and methods for confining the socket parts within the hub.

In Fig. 1, within the hub at the right end of the rod the socket piece or seat 9 engaging against one side of the ball of the crank arm 2 has a conical bossed extension 9' engaged into the expanded end of the rod 3. This seat is stationary and shoulders against the end of the rod 3 within the hub, and the bossed portion of the seat serves as an expander or reinforcement within the end of the rod 3, preventing the end of the rod from collapsing under longitudinal or pulling thrusts. The opposite seat 10 represents a steel stamping, providing an internal recess for one end of the spring 11, which yieldingly urges the seat 10 against the ball. The opposite end of the spring engages against an adjusting plug 12 threaded into the end of the hub, and locked against removal by a cotter pin 13 passing through apertures in the hub. In the socket arrangement within the hub section at the left end of the rod, the seats 10, 10, are of the same construction as the seat 10 at the right end of the rod, and a spring 11 engages one of the seats, and a nut and a washer or disk 14 resting against the flange end of the rod section 3, and the parts held in position by an adjusting plug 12 threaded within the hub section and locked by a cotter pin 13. With a spring interposed between the ball and socket member and either opposite end of the tubular member, the internally shouldered end of the hub member is yieldingly engaged with the head end of the link member, thus yieldingly longitudinally restrained, preventing rattling, but allowing the rod members to freely swivel upon each other.

In some constructions it is desirable to provide a spring for each seat at the opposite sides of the ball.

In Fig. 4, the hub sections 5 are shown in a reversed position from that of Fig. 1. In such instances, the rod section 3 extends into a larger diameter end of the hub through a collar 15 threaded into the end of the hub section and the parts locked against endwise displacement by a wire key 16, formed to loop around the rod section 3, with its ends bent and engaged into opposite perforations in the hub section 5. This key may be referred to as a spring clip for locking the collar 15 within the hub. The reduced end of the hub is provided with a cap 17. This arrangement of hub section provides an end opening, enabling the same to be conveniently filled with grease.

The socket seats and retaining parts may be of similar construction, as described in the form shown in Fig. 1, or the seats may be provided with expanding bosses bored to provide a grease passage to the ball.

The intermediate portion or link section may also represent a solid rod with conical or outwardly tapering ends instead of a tube.

Having described my invention, I claim:—

1. A steering rod connection consisting of a link section of tubing of a small diameter, a hub section of a tubing of larger diameter than the link section, having one end thereof reduced to an internal diameter of approximately the external diameter of the link section engaging and swiveled upon an end of said link section and providing an internal annular shoulder against which the inserted end of the link section is expanded to hold the parts together to prevent longitudinal displacement in one direction.

2. A steering rod connection comprising several lengths of different diameter, the length of one diameter providing a link section for the rod and having an outwardly flanged end, a length of larger diameter providing a hub section for the rod, having one end reduced in diameter to engage and swivel upon the link section and provide an annular shoulder for engagement with the flange end of the link.

3. A steering reach rod of several pieces of tubing of different diameter united together, comprising a link section having an expanded end and a hub section of larger diameter than the link section, freely telescopically engaged over the expanded end of said link section, and provided with an interior annular shoulder against which the expanded end of said link section engages.

4. A steering reach rod of several pieces of tubing of different diameter engaged together, comprising a link section having an outwardly expanded end and a hub section of larger diameter than the link section, having one end compressed, telescopically engaged and swiveling upon said link section and provided with a shoulder for engagement with the expanded end portion of said link section.

5. A steering reach rod of several pieces of tubing of different diameter comprising a link section having an expanded end, a hub section of larger diameter than the link section, said flange end of said link section engaging one end of said hub section and against an annular shoulder thereof, the opposite end of said hub section being compressed and cap threaded upon the compressed end of said hub section.

6. A steering reach rod comprising a link section and a tubular hub section having a reduced diameter end connected upon an end of said link section and free to swivel thereon.

7. A steering reach rod comprising a link section and a tubular hub section having a reduced diameter end swiveled upon the end of said link section, the engaged end of said link section being enlarged to secure the hub on said link longitudinally.

8. A steering reach rod comprising a link section and a tubular hub section having a reduced diameter end telescopically engaged over an end of said link section, the end of said link section within said hub section being headed for longitudinally securing said parts together.

9. A steering reach rod comprising a link section, a tubular hub section having a reduced diameter end swiveled upon the end of said link section, the engaged end of said link section being enlarged to secure the hub on said link longitudinally, socket members within said tubular hub section, and a crank arm engaged through an opening in the side of said hub section and having a ball end engaged between said socket members.

10. A connecting rod comprising a link section having a headed end and a tubular hub section having an internally shouldered end concentrically and loosely engaged upon the headed end of said link section for longitudinally connecting said section and adapting the sections to swivel one upon the other.

11. A connecting rod comprising a link section having a headed end and a tubular hub section having an internally shouldered end concentrically and loosely engaged upon the headed end of said link section for longitudinally connecting said section and adapting the sections to swivel one upon the other, and ball crank and socket members within said hub member, and springs interposed between said ball and socket members and link head within the hub section.

12. A connecting rod comprising a link section having a headed end and a tubular hub section having an internally shouldered end providing a socket for longitudinally connecting said member, a universal joint member housed within said hub section, and tension means engaging said joint members and yieldingly restraining said link and hub members longitudinally.

In witness whereof I hereunto subscribe my name, as attested by the two subscribing witnesses.

RICHARD A. KAPS.

Witnesses:
L. A. BECK,
M. F. MORAN.